United States Patent [19]

Wen et al.

[11] Patent Number: 5,781,221
[45] Date of Patent: Jul. 14, 1998

[54] METHOD OF PRINTING VISUALLY READABLE INFORMATION ON A COMPACT DISK

[75] Inventors: Xin Wen, Rochester; Charles D. DeBoer, Palmyra, both of N.Y.

[73] Assignee: Eastman Kodak Company, Rochester, N.Y.

[21] Appl. No.: 808,814

[22] Filed: Feb. 28, 1997

[51] Int. Cl.⁶ .................................................. B41J 2/47
[52] U.S. Cl. .......................................... 347/232; 347/262
[58] Field of Search ................................ 347/262, 264, 347/135.1, 232

[56] References Cited

U.S. PATENT DOCUMENTS

| | | | |
|---|---|---|---|
| 5,244,861 | 9/1993 | Campbell et al. | 503/227 |
| 5,317,337 | 5/1994 | Ewaldt | 346/1.1 |
| 5,430,281 | 7/1995 | Lentz et al. | 235/454 |
| 5,472,821 | 12/1995 | Taguchi | 430/203 |
| 5,489,768 | 2/1996 | Brownstein et al. | 235/414 |
| 5,518,325 | 5/1996 | Kahle | 400/70 |
| 5,542,768 | 8/1996 | Rother et al. | 400/120.16 |

OTHER PUBLICATIONS

"Graphic Arts Manual", edited by Janet and Irving Field, Arno/Musarts Press, New York, N.Y., 1980, pp. 416 to 418.

*Primary Examiner*—Mark J. Reinhart
*Attorney, Agent, or Firm*—Raymond L. Owens

[57] ABSTRACT

A method of printing human readable information on a CD having a substrate, a record layer over the substrate, and a reflective layer over the record layer includes the steps of providing a colorant donor element in transferable relationship with a surface of the CD over the reflective layer; raster scanning a light beam across the colorant donor element to cause the transfer of human readable colorant pixels onto such surface; and continuously raster scanning the light beam without any non-printing or free fly time during the transfer of such human readable colorant pixels.

5 Claims, 3 Drawing Sheets

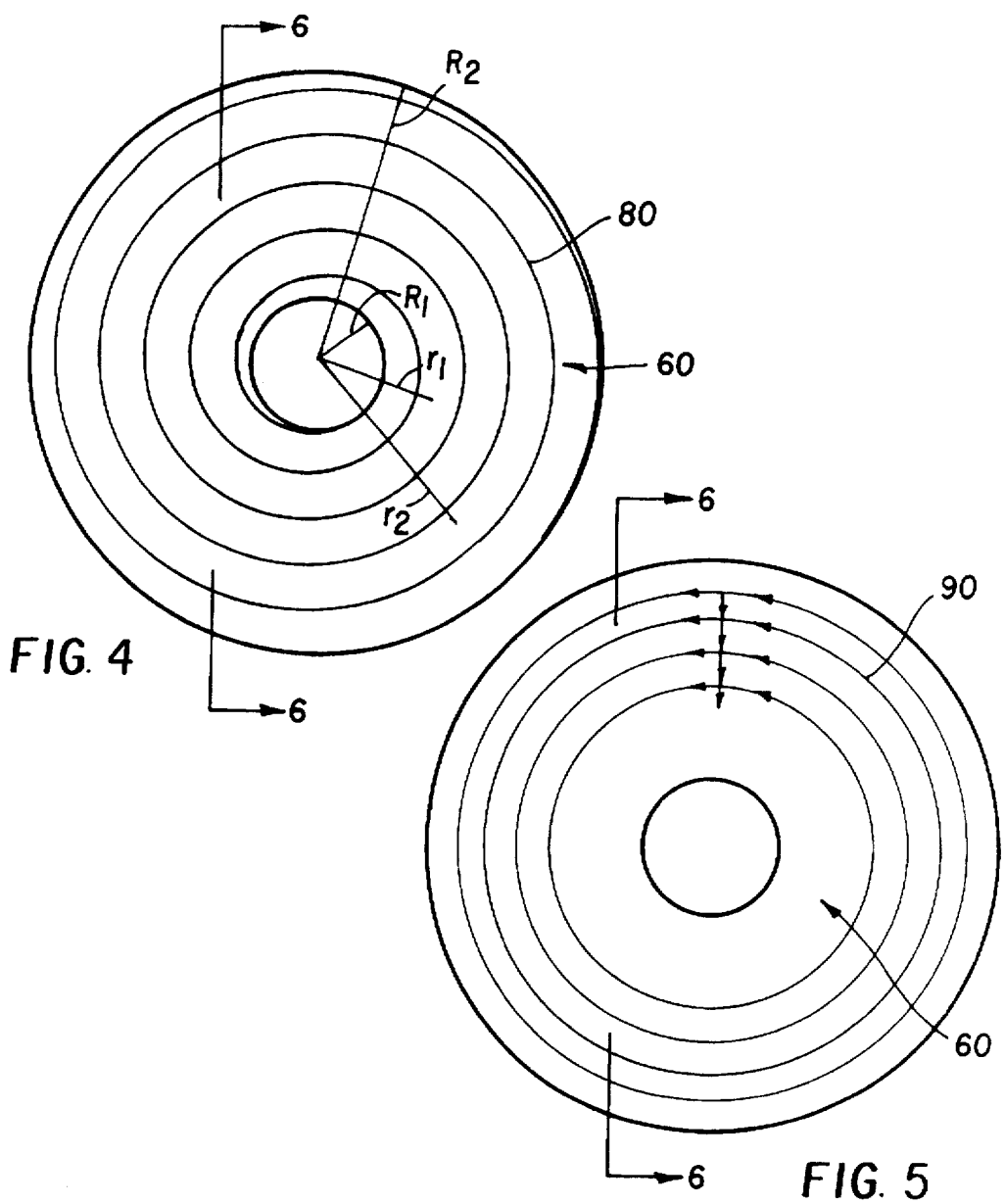
FIG. 4
FIG. 5
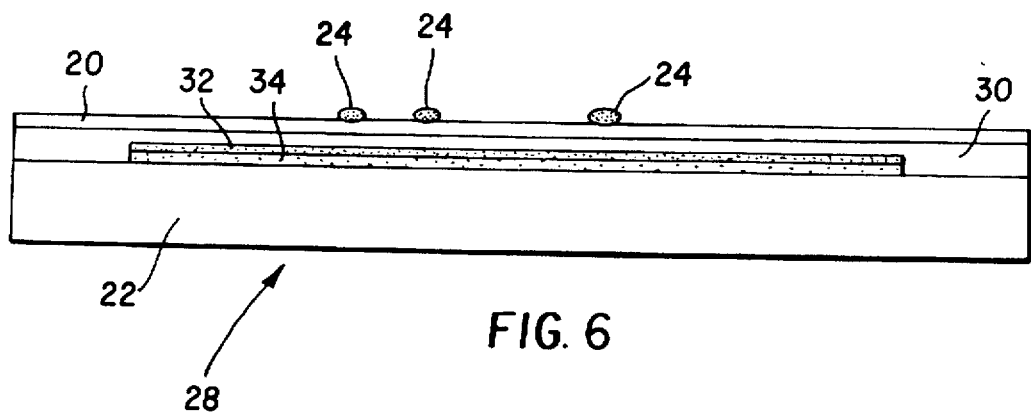
FIG. 6

METHOD OF PRINTING VISUALLY READABLE INFORMATION ON A COMPACT DISK

CROSS REFERENCE TO RELATED APPLICATIONS

Reference is made to commonly assigned U.S. Pat. application Ser. No. 08/779,695, filed Jan. 7, 1997, entitled "Printing Onto Disks Such As Compact Disks and the Like", to Wen et al; U.S. Pat. application Ser. No. 08/779,512, filed Jan. 7, 1997, entitled "Thermal Dye Transfer Printing of Compact Disks Labels", to Wen; assigned to the assignee of the present invention. The disclosure of these related applications is incorporated herein by reference.

FIELD OF THE INVENTION

The present invention relates to forming human readable information on a compact disk (CD).

BACKGROUND OF THE INVENTION

A compact disk (CD) is a high-volume and long lived data-storage medium. One recordable compact disk (CD-R) contains a polycarbonate disk that is coated with a dye layer, a metallized reflective layer, and a protective layer. A CD-R will be understood to be a compact disk that can be written on, typically by a laser beam as contrasted with a CD-ROM which information is replicated by injection molding. Cyanine, phthalocyanine, and metallized azo dyes are commonly used dyes coated in a polymer binder in the dye layer. The metallized reflective layer typically consists of gold in CD-R, and aluminum in CD-ROM. In a CD writer, a laser beam illuminates the dye polymers through the polycarbonate substrate as the disk spins. The illumination is turned on and off at selective locations determined by the input digital information. The heating by the laser causes the dye layer to chemically change at these locations, forming readable marks in the dye polymer. The degraded dye polymers in the marked regions are less reflective than the unmarked regions. During the reading process, a low-power laser scans the dye polymer layer in a recorded disk. The laser light is reflected directly from the unmarked regions, but is scattered or diminished in the marked regions. A sensor monitors the transitions between the marked and unmarked regions from the intensity of the reflective light, and converts it into a digital data stream. Similar to the above process, a CD-ROM differentiates the intensity of the reflective light by pits and lands in the compact disks. These pits and lands are prerecorded by pressing the compact disks, typically mass produced.

The CDs are often coated with a printable surface opposite to the surface from which the information is recorded and retrieved. On the printable surface, a label is printed which can be logos, trademarks, text, graphics, and bar codes, etc., which are related to the information stored on the CD. The label also protects the CD from physical damage. Because the CD spins at high speed in the writer and the player, the CD label needs to be precisely balanced to the center of the disk for smooth rotation.

Labeling of CD disks has routinely been accomplished through screen printing methods. While this method can provide a wide variety of label content, it tends to be cost ineffective for run lengths less than 300–400 disks because the fixed cost on unique materials and set-up are shared by all the disks in each run. The screen printing technique is well described in the textbook "Graphic Arts Manual", edited by Janet and Irving Field, Arno/Musarts Press, New York, N.Y., 1980, pp. 416 to 418. In screen printing a stencil of the image is prepared, placed in contact with the CD and then ink is spread by squeegee across the stencil surface. Where there are openings in the stencil the ink passes through to the surface of the CD, thus producing the image. Preparation of the stencil is an elaborate, time consuming and expensive process.

Recently, significant increases in use of CD-R disks as a data distribution vehicle have increased the need to provide customized CD label content to reflect the data content of the disk. For these applications, the screen label printing presents a dilemma as CD-R disks are designed to permit customized user information to be recorded in standardized CD formats.

Initially, the customized label information was "hand written" on the disk surface using felt tipped markers. While this approach permitted users to individually identify disks, it tends to be labor intensive, prone to human error in transcription, and aesthetically limited.

Other attempts to provide a CD-R labeling solution have incorporated digitally printed adhesive labels. Label stock for this type of CD-R labeling is available from a number of sources. This permits pre-cut labels to be printed using desktop or commercial ink-jet, thermal wax transfer, or printers. An example of such labels is the STOMP Company's (Irvine, Calif.) CD Stomper package of die-cut CD labels that can be printed on any 8.5 by 11 inch ink jet or laser electrophotographic printer. Following printing, the labels can be applied manually with or without the aid of an alignment tool or a specially designed machine. This method can be labor intensive. It is also prone to human error in label transfer. Damage to the CD-R can result if the label is removed. System performance problems can occur due to disk imbalance or label delamination in the CD writer or reader.

U.S. Pat. No. 5,317,337 describes an apparatus and method for printing label information on a CD. Both inkjet and laser electrophotographic printing are described, but the laser electrophotographic printing is limited to printing ink onto an intermediate drum and then transferring the image to the CD label, that is, offset printing Within the past several years, methods for direct CD labeling have been growing in prominence. These methods utilize the versatility and ease of the setup associated with digital printing to provide customized label content directly on a disk surface. The most commonly used direct CD printers incorporate ink jet or thermal wax transfer technologies. Examples of such printers are the AFFEX Corporation's (2522 Chambers Road, Suite 110, Tustin, Calif.) Multi Media Color Ink Jet Printer, and the FARGO Corporation's (Eden Prairie, Minn.) Signature CD Color Printer. These printers can either stand alone or be integrated into a computerized disk writing system reducing problems associated with labor, human error, disk damage, and imbalance. While printers of this type can produce satisfactory output, specially designed layers are required for their use. There is concern over performance of printed image quality for both types of printers. Thermal printing has demonstrated a lack of robustness with respect to abrasion and ink jet printing is less resistant to moisture. There are additional concerns over the inability to produce multicolor output on the thermal wax transfer CD-label printers, and the long print time required for the ink jet label printing. Additionally, both of these printers are binary in the density scale, and cannot reproduce continuous tone photographic images.

One known continuous-tone digital color printing technique is the thermal resistive dye diffusion (or sublimation) printer. Printing techniques have been disclosed in U.S. Pat. No. 5,542,768, and the above cross referenced copending applications. However, a thermal resistive head (both thermal wax transfer and dye diffusion) prints at a pressure contact to the CD surface. Good printing uniformity by thermal resistive printing requires (see for example, U.S. Pat. No. 5,244,861) a conformable layer in the receiving paper, which is lacking in CDs.

Prior screen printing CD-label printing techniques are not economic for printing label images on a small number of disks. Ink-jet and thermal wax transfer printing methods are binary and not high quality continuous tone printing. Thermal resistive head printing techniques including wax transfer and thermal dye diffusion printing require either a conformable surface or a high pressure nip contact between the print head and the CD surface, both of which make the process expensive and difficult. All the above techniques, to different degrees, are slow in printing speeds.

Several printing modes have been taught in the CD label printing. U.S. Pat. Nos. 5,317,337, 5,518,325, and 5,542,768 disclose a disk-wide printhead and a printing mode in which the printhead moves across the disk. U.S. Pat. 5,317,337 also discloses a printing mode in which a print head fast scans along the radial direction and the slow scan is done by disk rotation.

The CDs can also be marked outside of the label area with machine or human readable symbols such as disclosed in U.S. Pat. 5,430,281 and 5,489,768.

SUMMARY OF THE INVENTION

An object of this invention is to provide effective high speed methods that prints label records on CDs.

Another object of this invention is to provide an economic way of printing label records on small number of CDs.

These objects are achieved by a method of printing human readable information on a CD, comprising the steps of:

a) providing a CD having a substrate, a record layer over the substrate, and a reflective layer over the record layer;

b) providing a colorant donor element in transferable relationship with a surface of the CD over the reflective layer;

c) raster scanning a light beam across the colorant donor element along a predetermined path to cause the transfer of human readable colorant pixels onto such surface; and d) continuously raster scanning the light beam without any non-printing or free fly time during the transfer of such human readable colorant pixels.

ADVANTAGES

CD human readable printing in accordance with this invention includes the following features: 1) the human readable information is not limited to the areas of the disk where no information is stored but can overlap stored digital information; and 2) the human information does not interfere in the reading process of the recorded digital information.

Another feature of the present invention is that it significantly reduces print time compared to prior art techniques.

A still further feature of this invention is that it further reduces print time when a portion of radial range is printed in a circular fashion.

Another feature of this invention is that the printable area within circular borders can be more efficiently utilized.

Another feature of this invention is that the invention techniques are compatible with printing different color planes in separate passes or a single pass.

Another feature of this invention is that the invention techniques are applicable to different printing methods such as infra-red laser thermal, ink jet and the like.

BRIEF DESCRIPTION OF THE DRAWINGS

FIG. 4 illustrates a disk in which human readable information has been raster scanned in a spiral fashion onto its surface;

FIG. 5 illustrates a disk in which human readable information has been raster scanned in a circular fashion onto its surface; and FIG. 6 is a cross sectional view of a disk of either FIGS. 4 or 5, taken along the lines 6—6 of either FIG. 4 or FIG. 5, in which human readable information has been formed on the disk surface.

DETAILED DESCRIPTION OF THE INVENTION

Figure 1:
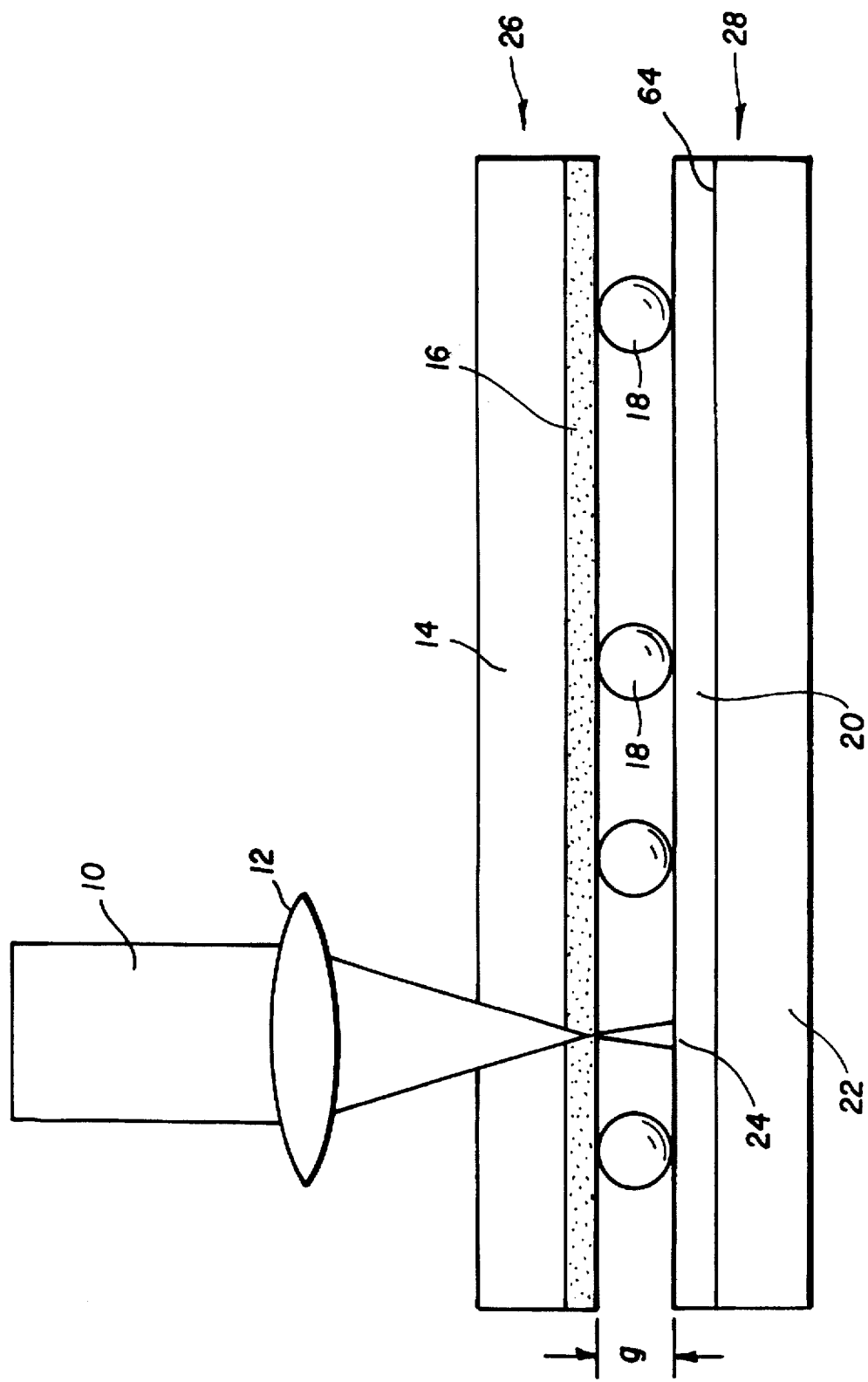
FIG. 1 is an apparatus which focuses a laser beam on a dye donor element for transfer of the record to write CD label information on a compact disk.

Referring to FIG. 1, a collimated laser beam 10 is focused by a lens 12 through the donor element support 14 on the colorant layer 16 on the donor element 26. The donor element 26 is separated from the disk 28 by spacer beads 18. The donor element 26 includes colorant such as a dye or pigment which, upon the application of heat, will be transferred onto the surface of a disk 28. A transparent polymeric substrate 22 in the disk 28 is coated with disk record layer 20 on the external surface 64. The disk record layer 20 is a polymeric layer that receives colorant which forms a CD label. The colored pixels are provided over the record layer so that, when the record layer is read, no reading light will pass through the colored pixels, but will be reflected off the reflective layer 32. The heating of colorant layer 16 in the donor element 26 transfer a colored pixel 24 to the disk record layer 20. The CD human readable information includes all the colored pixels printed by the printing apparatus. In this invention, CD label information is human visible information such as logos, trademarks, text, graphics, and bar codes, that are formed as reflective marks on the CD label Details of this printing apparatus are described in commonly assigned U.S. Pat. application Ser. No. 08/779,512, filed Jan. 7, 1997, the disclosure which is incorporated by reference herein.

Figure 2:
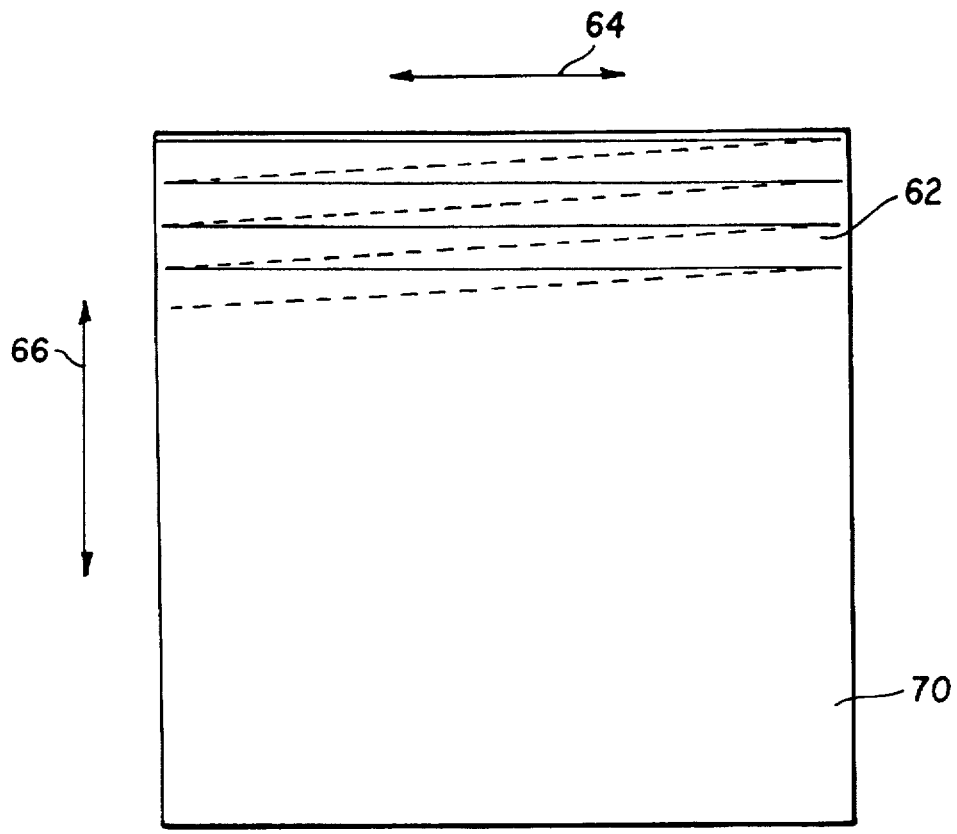
FIG. 2 illustrates a prior art laser printing arrangement which includes raster scanning of laser light.

Referring to FIG. 2 which shows a prior art arrangement wherein human readable information has been formed on a receiving surface. A focused laser spot is scanned in parallel raster line 62 in a rectangular scanned area 70. After printing (colored pixel 24 transfer) is made on a raster line 62 along the fast scan direction 64, the focused laser spot is moved to the beginning of the next raster line. The slow scan direction 66 is thus perpendicular to the fast scan direction 64. The printing time comprises about 85% of the total scan time and the rest 15% time is spent between raster lines 62.

Figure 3:
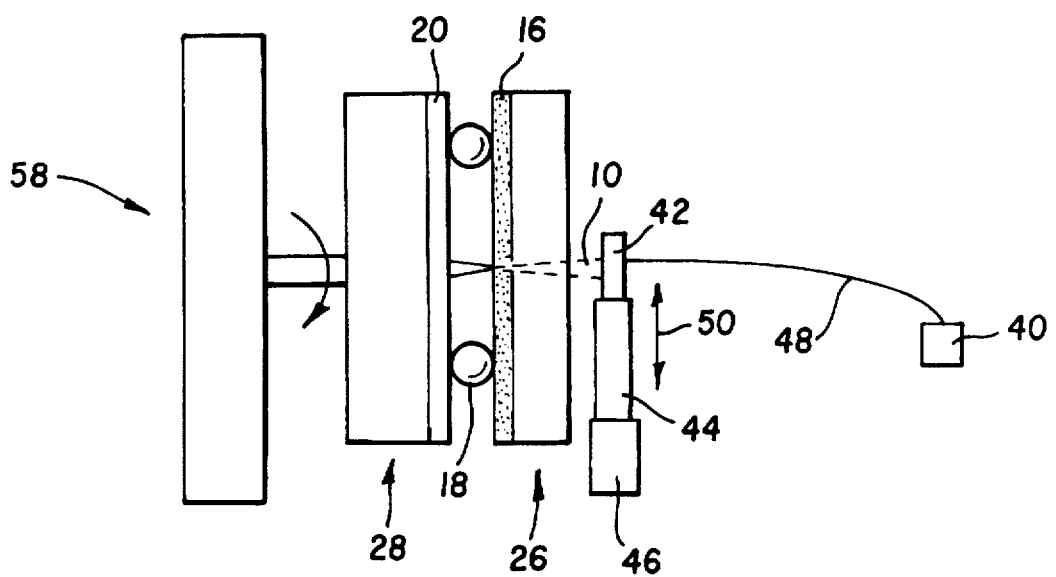
FIG. 3 illustrates an apparatus for scanning a laser beam which is focused on a dye donor element for transferring colorant from a donor element onto a CD surface to record human readable information.

Referring to FIG. 3, an apparatus in accordance with the present invention is illustrated. A laser diode 40 is coupled to an optical fiber 48 which is further transmitted to an optical coupler assembly 42. The laser beam emitted from the laser diode 42 is focused by the optical coupler assembly 42 onto the colorant layer 16 of the donor element 26. The focused laser beam 10 transfers colorant in the form of colored pixels to the disk record layer 20 from the donor element 26. The disk 28 is rotated by a rotation mechanism 58. The optical coupler assembly 42 (which performs the function of a print head) is attached to a translation stage 44 which is driven by a motor 46 in the radial direction 50 of the CD.

The disk record layer 20 (FIG. 3) does not always have to be coated with additional materials. The colored pixel (24) can be directly transferred to certain disk polymeric supports. For example, when polycarbonate is used as the disk polymer support, the colored pixels 24 were successfully transferred by the inventors and good color images were obtained. It is understood that the infra-red laser is used only as an example to illustrate the invention concept.

In FIGS. 4 and 5, disks 28 are shown with the human readable information recorded thereon. FIG. 6 is a cross sectional view of such a disk 28. As shown, it includes the disk record layer 20 and the transparent polymeric substrate 22. Colored pixels 24 are formed on the disk record layer 20 by the apparatus shown in FIG. 3. A protective layer 30 is formed over the metallized reflective layer 32 and the disk record layer 20 is formed on the protective layer 30. In this arrangement, the colorant has been transferred from the donor element 26 to form colored pixels 24. As shown, the metallized reflective layer 32 is formed directly over the record layer 34 in which digital information is recorded. This is an important feature of the present invention since the colored pixels 24 can be formed directly over the record layer 34 and that the record layer 34 can be read by laser light transmitted through the transparent substrate 22 without interference from the colored pixels 24.

Referring again to FIG. 3, wherein one mode of operation of the present invention is depicted. The disk 28 is rotated around its axis by a rotation mechanism 58 at high speed during printing. During the each cycle of rotation, the laser beam is displaced uniformly by motor 46 along the radial direction 50 at slower speed so that it scans a predetermined path. One raster line width is incremented along the radial direction 50 during each cycle of rotation. The next cycle of information is then printed continuously. The above described printing path is the spiral raster line 80 illustrated in FIG. 4. The spiral raster line 80 is continuous with no non-printing scan in between, which essentially completely occupies the printable area 60. Since the laser beam spot size (and thus the line width) can be focused to be smaller than 10 micron, the two ends of the spiral raster line 80 are essentially invisible within normal viewing distance. Note that the pitch between sequential circles of the spiral raster line 80 is exaggerated in FIG. 4 for visual clarity.

The different color planes can be printed sequentially or printed in a single pass. In the former case, after the first color plane is printed as described in the above modes of operation, the first donor patch is removed. The second color donor is placed in position and the printing process is repeated with the second color plane in the digital record. The steps are repeated until all color planes are finished. In this way, multiple colors can be visually printed on a disk to provide CD label information.

For printing within circular printable areas, proper image processing is often required to prepare for the raster image in a spiral or a circular fashion as is well known in the art. Rectangular shaped images can be transformed into the polar coordinates so that raster lines may be defined at a function between the polar angle and the radial distance. The spiral raster line 80 (FIG. 4) is defined by a linear function between the radial distance and the polar angle.

The reduction in print time is now compared to the prior art (see FIG. 2) in the following calculation. Assuming identical and uniform linear velocities between the laser beam and the disk surface, the print time $(T_1)$ in the first mode of operation of the present invention is significantly shortened than that $(T_p)$ of the prior art. This print time reduction is a result of 1) elimination of nonprinting time (the 15% down time in the prior art duty cycle), and 2) the elimination of the scan times spent in the areas outside of the printable area 60 but within the scanned area 70. Although the prior art disclosed in FIG. 2 was not with reference to a disk, in order to perform the following calculations it will be assumed that a disk was recorded on just for the purpose of showing advantages of this invention. For the purpose of these calculations we will assume the smallest square which covers the printable area of the CD and there will be four contact points with the disk. The laser beam in the present invention only scans the printable area 60 within circular boundaries.

$$T_1 = T_p \times 0.85 \times \pi (1-(R_2/R_1)^2)/4 \quad (1)$$

For a typical CD label, $R_2=5.8$ cm and $R_1=2.0$ cm. Thus $$T_1 = 0.588 \times T_p \quad (2)$$

The present invention represents a 41% reduction in print time for each color plane.

In a second mode of operation of this invention, again referring to FIG. 3, the disk 28 is rotated around its axis by a rotation mechanism 58 at high speed during printing. During the each circle of rotation, the laser beam is displaced at non-uniform speed along the radial direction. For example, the laser beam can be incremented along the radial direction only when each circle is completed. The radial displacement is followed by the printing of the next circle of information. The above example gives a printing path that comprises concentric circular serpentine raster line 90, as illustrated in FIG. 5. The printing is essentially continuous with no gap in between. The circular serpentine raster line 90 completely occupies the printable area 60. Note that in FIG. 5 the pitch between the circles of the circular serpentine raster line 90 is exaggerated for visual clarity and the circular serpentine raster line 90 is not illustrated in the whole printable area as in the real applications.

Special care is required to guarantee uniform printing over the whole label area. This can be achieved by several methods. In the first method, the linear velocity of the laser beam relative to the CD surface is controlled to be constant throughout printing. In other words, the angular velocity of the disk is controlled to be inversely proportional to the radial distance to the center of the disk (note that the linear velocity is the product of the radial distance and the angular velocity: v=rω). The print time for each pixel (fixed size) is constant at different radial locations. For each desired print density, the laser power and the exposure energy applied are the same at different radial locations.

In the second method, the angular velocity of the disk rotation is held constant. For a fixed pixel size, the laser exposure time per pixel is therefore inversely proportional to the radial distance. More laser energy needs to be applied to pixels at larger radial distance because the laser exposure time is shorter at those pixels. This can be achieved, for example, by controlling the laser power to be proportional to the radial distance so that constant laser energy is applied to pixels at different radial locations. Furthermore, printing uniformity can be further improved by minimizing the reciprocity effect caused by different exposure time per pixel.

In some CD label printing applications, it is desired to print image object along the circular borders so that the label area can be most efficiently utilized. This desirable customer need is discussed in detail in the commonly assigned U.S. patent application Ser. No. 08/779,695, filed Jan. 7, 1997, the disclosure which is incorporated by reference herein. The present invention are particularly beneficial for these applications.

In many CD printing applications, the images intended to be printed do not occupy the whole CD label areas. In these cases, the print speed can be increased even further using the invention techniques. For example, referring to FIG. 4, if the intended print area is within a radial range of $[r_1, r_2]$ where $R_1 < r_1 < r_2 < R_2$. Then the raster scan can be started from $r_2$, and finish at $r_2$ wherein $R_1$ is the internal radius of the compact disk and $R_2$ is the external radius of the CD and $r_1$ and $r_2$ are respectively the internal and external boundaries (radii) respectively of the intended area for recording human readable information.

The invention has been described in detail with particular reference to certain preferred embodiments thereof, but it will be understood that variations and modifications can be effected within the spirit and scope of the invention.

Parts List

| | |
|---|---|
| 10 | collimated laser beam |
| 12 | lens |
| 14 | donor support element |
| 16 | colorant layer |
| 18 | spacer beads |
| 20 | disk record layer |
| 22 | transparent polymeric substrate |
| 24 | colored pixel |
| 26 | donor element |
| 28 | disk |
| 30 | record protection layer |
| 32 | metallized reflective layer |
| 34 | record layer |
| 40 | laser diode |
| 42 | optical coupler assembly |
| 44 | translation stage |
| 46 | motor |
| 48 | optical fiber |

-continued

Parts List

| | |
|---|---|
| 50 | radial direction (movement direction of the translation stage 44) |
| 58 | rotation mechanism |
| 60 | printable area |
| 62 | raster scan lines (in the prior art) |
| 64 | fast scan direction (in the prior art) or external surface |
| 66 | slow scan direction (in the prior art) |
| 70 | scanned area (in the prior art) |
| 80 | spiral raster line |
| 90 | circular serpentine raster line |

We claim:

1. A method of printing human readable information on a CD, comprising the steps of:

a) providing a CD having a substrate, a record layer over the substrate, and a reflective layer over the record layer;

b) providing a colorant donor element in transferable relationship with a surface of the CD over the reflective layer;

c) raster scanning a light beam across the colorant donor element along a predetermined path to cause the transfer of human readable colorant pixels onto such surface; and d) continuously raster scanning the light beam without any non-printing or free fly time during the transfer of such human readable colorant pixels.

2. A method according to claim 1 wherein colored pixels are provided over the record layer so that, when the record layer is read, no reading light will pass through the colored pixels, but will be reflected off the reflective layer.

3. The method according to claim 1 wherein the raster scanning is accomplished by scanning the laser beam in a circular pattern in an information or label area of the CD so that while during a printing cycle, there is no raster line free fly time during such printing cycle.

4. A method according to claim 1 of printing information in an area on a CD in a predetermined path, wherein the raster scanning is accomplished by scanning the laser beam in a spiral pattern in an information or label area of the CD so that while during a printing cycle, there is no raster line free fly time during such printing cycle.

5. The method of claim 1 wherein the colorant element raster path is of a circular shape.

* * * * *